United States Patent Office 3,483,849
Patented Dec. 16, 1969

3,483,849
ROTARY PISTON ENGINE
Kenichi Yamamoto, 41–1, 3-chome, Funairi, Minami-cho, Hiroshima-shi, Hiroshima-ken, Japan
Filed Jan. 25, 1968, Ser. No. 700,481
Claims priority, application Japan, Jan. 25, 1967, 42/6,940
Int. Cl. F02b 53/10
U.S. Cl. 123—8      4 Claims

ABSTRACT OF THE DISCLOSURE

This invention relates to a rotary piston engine wherein a polygonal rotor makes planetary rotation within a casing comprising two side housings respectively in parallel with each other, the center housing having a multi-arc form internal surface, to carry out the inhaling of fuel-air mixture gas, compression, explosion, expansion, and exhaustion in turn, which is characterized in that a part of the high temperature gas in process of expansion is discharged into the exhaust chamber, and at the same time, fresh compressed air is jetted into said exhaust chamber to effect substantially complete combustion of the waste gas.

---

This invention relates to a rotary piston engine, and more in particular, to a rotary piston engine comprising means for discharging a part of the high temperature combustion gas in the expansion chamber into the exhaust chamber, and at the same time jetting fresh compressed air into said exhaust chamber to effect substantially complete combustion of the waste gas.

In accordance with conventional rotary piston engines, for example, in the exhaust manifold, the secondary air is jetted into the waste gas, and re-ignition occurs because of the heat possessed by the waste gas, thus to carry out oxidation combustion; and carbon monoxide or hydrocarbons contained in the waste gas or such like injurious matters are removed. However, when the waste gas has not sufficient heat, re-ignition is difficult to effect, even if the fresh secondary air should be injected, and in particular, in case of idling or low load, the heat of the waste gas is low, and therefore re-ignition cannot be satisfactorily carried out.

Therefore, in order to perform perfect or complete re-combustion, a complicated after-burner must be provided at present.

This invention aims to remove the above-mentioned drawbacks of the conventional rotary engines in such a manner that a part of the high temperature waste gas in the expansion process of a rotary engine is discharged into unburnt waste gas, and it is re-burnt along with the compressed air which is the secondary air always jetting into the combustion chamber, whereby re-combustion is carried out without using an after-burner even when the heat of the waste gas is low as in idling or low load.

The novel characteristic of this invention resides in a rotary piston engine wherein a polygonal rotor makes planetary rotation within the casing comprising two parallel side housings and the center housing having a multi-arc form internal surface to carry out inhaling of fuel-air mixture gas, compression, explosion, expansion and exhaustion in turn, and a path is formed in a part of the casing to discharge a part of the burnt gas in the expansion process into the exhaust chamber, and at the same time fresh compressed air is jetted into the exhaust chamber. The path can be formed in either or both of the side housing and center housing.

The present invention will be described more in detail referring to the illustrative embodiment shown in the drawing, in which.

Figure 1:
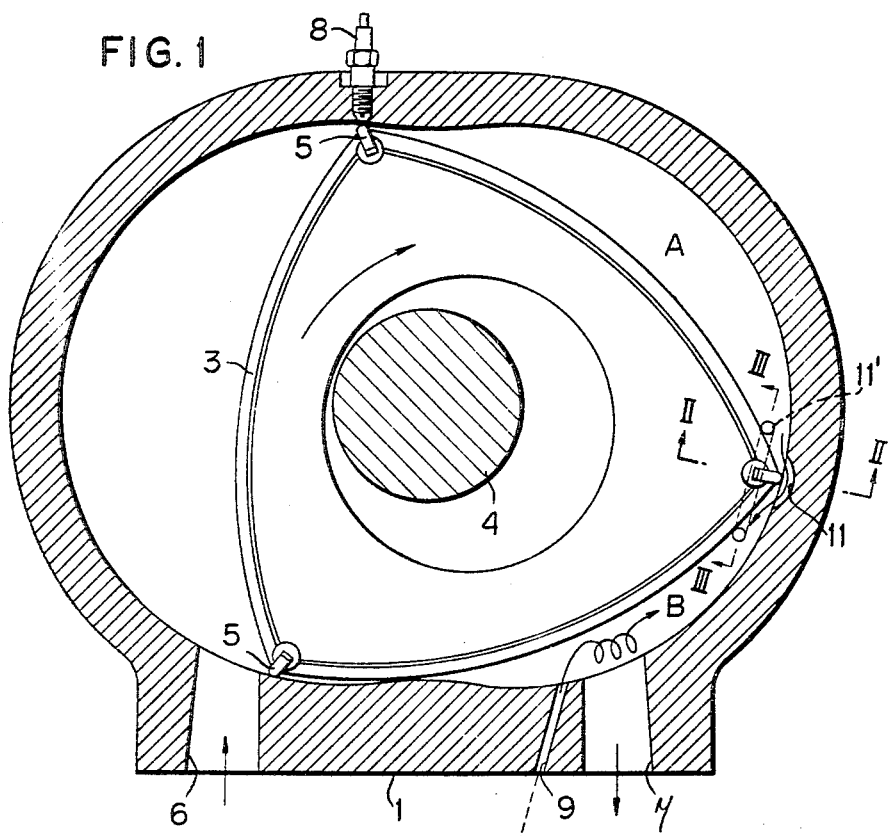
FIG. 1 shows a vertical cross-section of an embodiment of the present invention, where paths are provided within both side housing and center housing.
Figure 2:
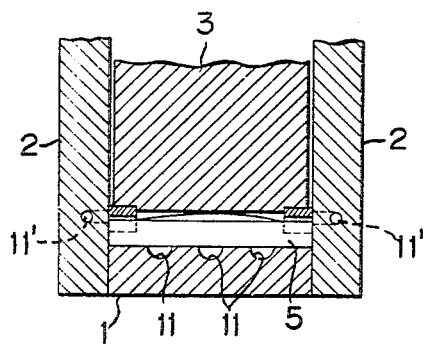
FIG. 2 is a cross-section taken along line II—II of FIG. 1.

In the drawing, 1 is a center housing of a rotary piston engine, 2 is one of two side housings, 3 is a rotor which makes a planetary rotation within a casing composed of the center housing 1 and side housings 2 and is rotatably supported on an eccentric shaft 4, 5 is an apex seal inserted into the respective tops of the rotor 3 in the radial direction and these apex seals 5 are always in contact with the internal surface of the center housing 1 to keep the air-tightness of the respective chambers, 6 is an intake port, 7 is an exhaust port, while 8 is an ignition plug and is provided in the center housing 1, 9 is a port for jetting out the compressed air for re-burning the unburnt waste gas, 10 is an air-pump shown diagrammatically for continuously supplying compressed air and, 11 is a path provided on the internal surface of the center housing 1 for discharging a part of the waste gas in the expansion chamber into the exhaust chamber.

In the above exemplified structure of the rotary piston engine of this invention, when the mixture gas inhaled from the intake port 6 is expanded through compression and explosion, a part of the high temperature waste gas in the expansion chamber A is discharged into the exhaust chamber B as is shown by an arrow through the path 11 when the rotor 3 comes to the position as is shown in FIG. 1, and the unburnt waste gas is ignited by the compressed air jetted from the port 9, as is shown by an arrow, and the unburnt waste gas is oxidized and burnt almost completely.

Thus, the waste gas removed from the exhaust pipe through the exhaust port 7 into the air, has been substantially perfectly burnt, and it is possible to remove the injurious matters satisfactorily without using a complicated after burner.

In the above given embodiment, the path 11 is provided on the center housing 1, but another path 11' can be provided on the side housing 2 in addition or alternative to the path 11. The port 9 can also be provided in the side housing.

Figure 3A:
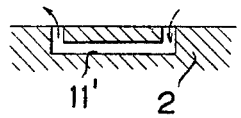
FIG. 3A is a cross-section taken along line III—III of FIG. 1 and illustrates a gas path formed in the housing.
Figure 3B:
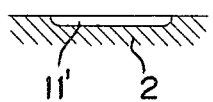
FIG. 3B is similar to FIG. 3A but illustrates a further embodiment of same.

In FIG. 3A, the path 11' penetrates the side housing 2, while in FIG. 3B, the path 11' is engraved on the inner surface of the side housing 2.

The appropriate position and size of the path 11 or 11' can be experimentarily determined.

As is apparent from the above explanation, in accordance with this invention, a path is provided on the casing to discharge a part of the burnt gas in the expansion process into the exhaust chamber, and secondary compressed air is jetted into the exhaust chamber. Thus, while a part of the high temperature gas in the expansion process is discharged into the exhaust chamber, compressed air is also jetted into that chamber and the unburnt gas within the exhaust chamber is easily and properly re-ignited and substantially perfect combustion of the unburnt gas is performed.

Therefore, even when idling or low load working is carried out, the secondary air is jetted at the moment and place where the waste gas has sufficient heat, so that near perfect combustion can be carried out satisfactorily. Therefore in accordance with this invention, the injurious matters can be removed through combustion without using complicated apparatuses such as after-burners.

What is claimed is:

1. Rotary piston engine wherein a polygonal rotor makes planetary rotation within a casing having a multi-arc form internal surface, to carry out the respective processes of inhaling of the mixture gas, compression, explosion, expansion, and exhaustion in turn, which comprises providing a path on a part of the casing to discharge a part of the burnt gas in the expansion process into the exhaust chamber and means for jetting compressed air into the exhaust chamber.

2. Rotary piston engine according to claim 1, wherein said casing is composed of two side housings and a center housing and said path is provided on the center housing.

3. Rotary piston engine according to claim 1, wherein said casing is composed of two side housings and a center housing and said path is provided on the side housing.

4. Rotary piston engine according to claim 1, wherein said casing is composed of two side housings and a center housing and said paths are provided on both the center housing and the side housing.

References Cited

UNITED STATES PATENTS

| | | | |
|---|---|---|---|
| 1,255,403 | 2/1918 | Gardner et al. | 123—8 X |
| 3,103,920 | 9/1963 | Georges | 123—8 X |

C. J. HUSAR, Primary Examiner